United States Patent
Simpson et al.

(10) Patent No.: US 6,676,310 B2
(45) Date of Patent: Jan. 13, 2004

(54) CHECK WRITING SYSTEM AND METHOD

(75) Inventors: Shell Sterling Simpson, Boise, ID (US); Ward Scott Foster, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 40 days.

(21) Appl. No.: 09/998,948

(22) Filed: Nov. 15, 2001

(65) Prior Publication Data

US 2003/0091376 A1 May 15, 2003

(51) Int. Cl.[7] ............................. B41J 9/44; G06F 17/60
(52) U.S. Cl. ............................. 400/61; 705/40; 705/44; 705/45; 358/1.14
(58) Field of Search .................. 400/61, 103; 709/203, 709/218; 358/1.14; 705/40, 44, 45

(56) References Cited

U.S. PATENT DOCUMENTS

| | | | | | |
|---|---|---|---|---|---|
| 5,299,295 | A | * | 3/1994 | Kim et al. ................. | 358/1.12 |
| 5,470,160 | A | * | 11/1995 | Nowlin ....................... | 400/105 |
| 5,483,049 | A | * | 1/1996 | Schulze, Jr. ................. | 705/14 |
| 6,088,119 | A | * | 7/2000 | Manchala et al. ......... | 358/1.14 |
| 2002/0067827 | A1 | * | 6/2002 | Kargman ..................... | 380/54 |
| 2003/0023670 | A1 | * | 1/2003 | Walrath ....................... | 709/203 |

\* cited by examiner

*Primary Examiner*—Andrew H. Hirshfeld
*Assistant Examiner*—Hoai-An D. Nguyen

(57) ABSTRACT

The present disclosure relates to a system and method for facilitating the writing of checks. In some arrangements, the system and methods pertain to receiving data to be included in a check to be printed via a network, configuring the received data for printing on a check, and facilitating printing of the check.

21 Claims, 6 Drawing Sheets

CHECK WRITING SYSTEM AND METHOD

FIELD OF THE INVENTION

The present disclosure relates to a system and method that facilitates check writing. More particularly, the disclosure relates to a web-based system and method with which checks can be generated and, if desired, check generation can be monitored.

BACKGROUND OF THE INVENTION

Checks are often printed by users in office environments. For example, many insurance branch offices print and issue checks to their claimants. Often, the checks are generated using check writing applications that execute independently on several different employees' personal computers (PCs). In such a scenario, the employee can identify the various check information (e.g., payee, payment amount, etc.) and send this information to a printing device (e.g., printer) that contains preprinted check media.

To prevent fraud in arrangements such as that described above, only certain persons are permitted to print checks. These persons identify their authorization to print checks by, for instance, providing a user name and password before the check writing application is used to generate checks. In addition, a code normally accompanies the print job that is sent to the printing device so that the check writing process can be monitored. Unfortunately, however, these security measures do not prevent all forms of fraudulent activities from occurring. For instance, if an unscrupulous employee simulates a jam condition, the employee may be able to access the preprinted check media and either print out his or her own checks or distribute the blank checks to others.

One reason that such manner of fraud can be perpetrated is the decoupled nature of the check writing application and the printing device. Specifically, in that the check writing application is not closely associated with the printing device, it is unaware of the activities of the printing device and vice versa. If the check writing application and the printing device were more closely linked, however, such fraudulent activities could be prevented and/or discovered more quickly.

SUMMARY OF THE INVENTION

The present disclosure relates to a system and method for facilitating the writing of checks. In some arrangements, the system and method pertain to receiving data to be included in a check to be printed via a network, configuring the received data for printing on a check, and facilitating printing of the check.

The present disclosure further relates to a printing device. In some arrangements, the printing device comprises hard copy generation hardware, a processing device, and memory including an embedded network server, the server hosting a check writing service with which checks can be created and printed.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed is a system and method for facilitating check writing. Generally speaking, the system and method can be used to access a network-based (e.g., web-based) imaging service that enables the user to identify the imaging data to be used to generate checks. Once the data has been identified, it can be stored by the service and, if desired, one or more hard copy documents (i.e., checks) can be generated.

To facilitate description of the inventive system and method, example systems are discussed with reference to the figures. Although these systems are described in detail, it will be appreciated that they are provided for purposes of illustration only and that various modifications are feasible without departing from the inventive concept. After the description of the example systems, examples of operation of the systems are provided to explain the manners in which check generation can be facilitated.

Figure 1:
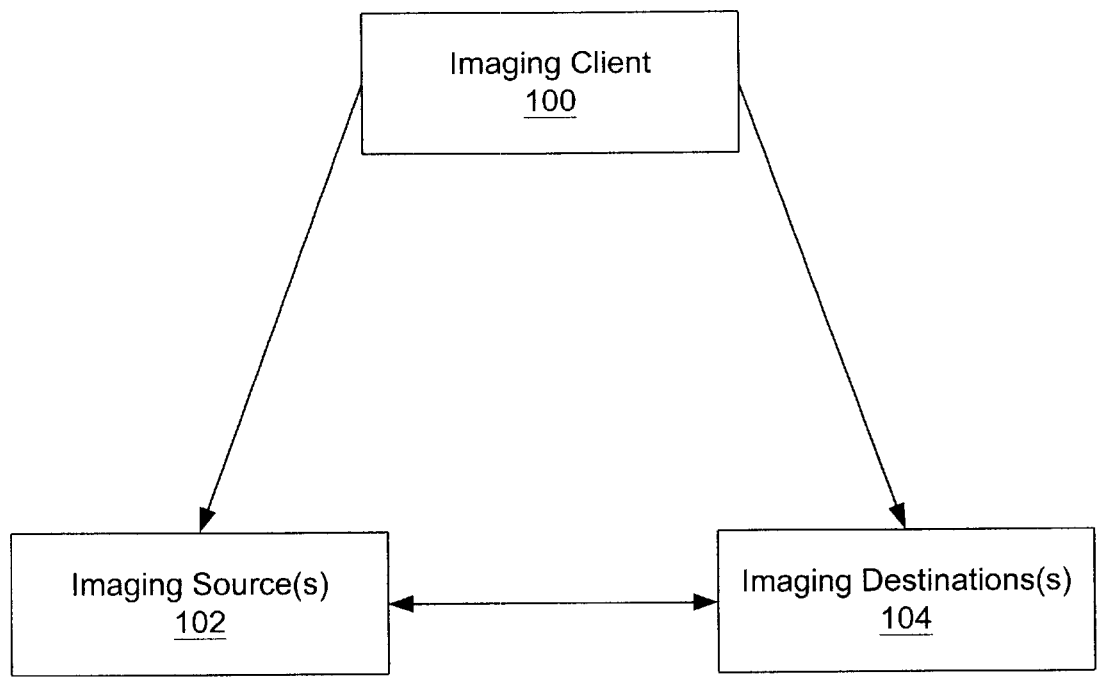
FIG. 1 is a schematic representation of the general operation of the invention.

FIG. 1 is a schematic representation of the general operation of the invention. As shown in this figure, an imaging client 100 communicates with one or more imaging sources 102 and one or more imaging destinations 104, which can in some arrangements comprise the same device and/or service. The imaging source(s) 102 represent any of a wide variety of devices/services that can be accessed by the imaging client 100 and used to input data that will be used to create a document, such as a check. Once the imaging data have been input, the imaging client 100 can identify data from the imaging source(s) 102 that are to be used by the imaging destination(s) 104 for printing, as well as the arrangement of the data within the printed document. The image destination(s) 104 can then print the document(s) according to the client's selections.

Figure 2:
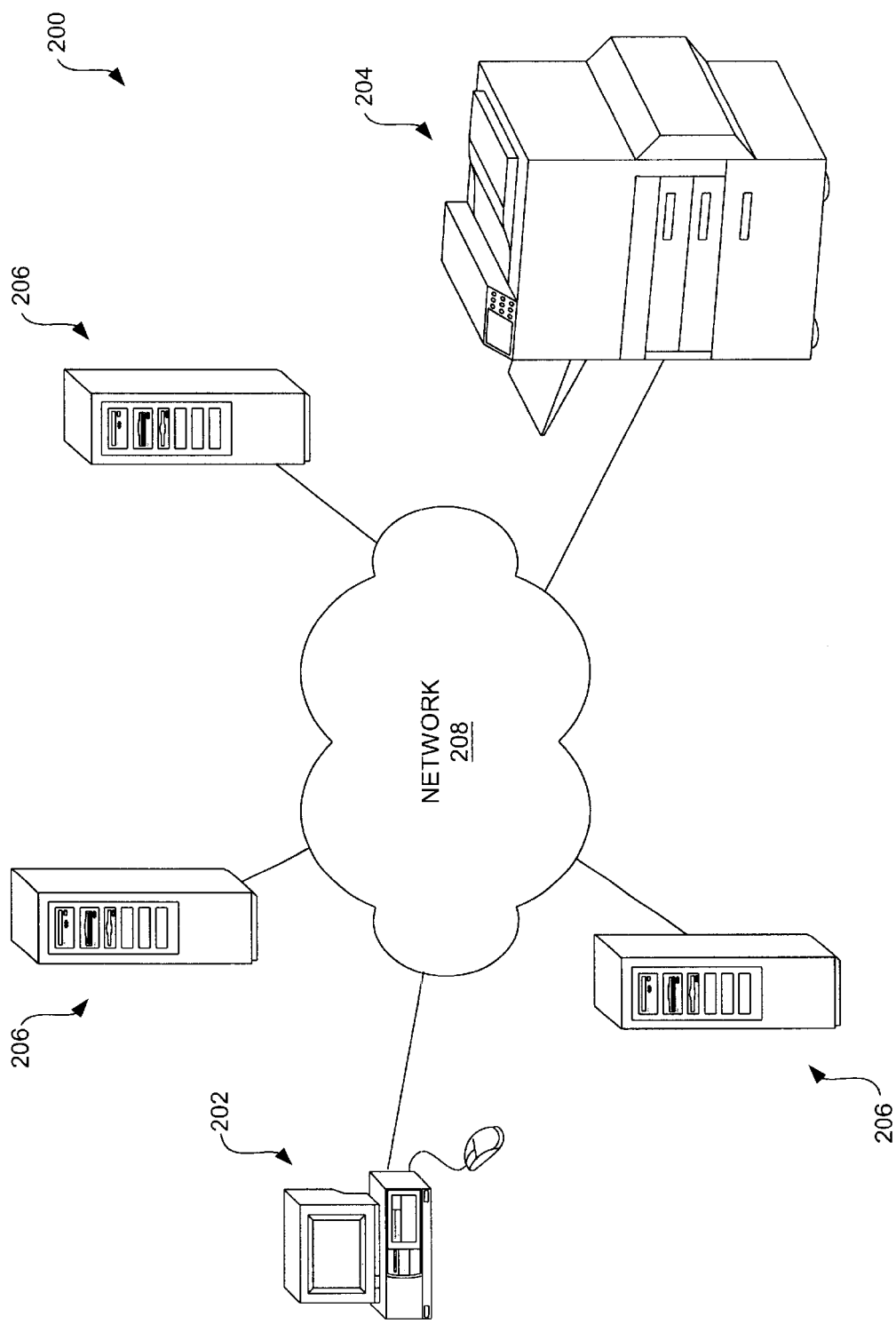
FIG. 2 is an example system in which the invention can be implemented.

FIG. 2 illustrates an example system 200 with which the invention can be implemented. As indicated in this figure, the example system 200 generally comprises a computing device 202, a printing device 204, and one or more network servers 206, each of which can be connected to a network 208. As indicated in FIG. 2, the computing device 202 can be arranged as a personal computer (PC). More broadly, however, the computing device 202 can comprise substantially any device that can be used to communicate via the network 208 and, therefore, access and/or be accessed by check writing services made available over the network. By way of example, the computing device 202 can alternatively comprise a notebook computer, Macintosh computer, handheld computer such as a personal digital assistant or mobile telephone, smart card, etc.

The printing device 204 comprises any device that is capable of generating hardcopy documents in the form of a check. Although the term "printing device" is used herein, it is to be understood that the disclosure is not limited to any particular type of device that provides this functionality. Accordingly, the term is intended to include any appliance or printing device (e.g., printer, photocopier, facsimile machine, multifunction peripheral (MFP), etc.) that either inherently provides this functionality or which provides it when a suitable accessory is used in conjunction therewith.

The one or more network servers 206 typically comprise computing devices similar in configuration to the computing device 202, but which normally possess greater resources in terms of processing power, memory, and/or storage space. As will be apparent from the discussions provided below, the network servers 206 are typically used with the Internet (public or private) and, therefore, typically comprise web servers. Although the use of Internet networking protocols (e.g., transmission control protocol (TCP) and/or internet protocol (IP)) may mean that web protocols (e.g., hypertext transfer protocol (HTTP)) will be used, it will be recognized by those skilled in the art that HTTP is just one of many protocols capable of being used on Internet networks. The network 208 normally comprises one or more sub-networks that are communicatively coupled to each other. By way of example, these networks can include one or more local area networks (LANs) and/or wide area networks (WANs) that comprise a set of networks that forms part of the Internet. In addition to the network connections shown in FIG. 2, one or more of the computing device 202 and servers 206 can be directly connected to the printing device 204 (not shown). Direct connection between the computing device 202 and the printing device 204 may be likely where the printing device is used in a home or small office environment in which the user does not have access to a network. Direct connection between a network server 206 and the printing device 204 may be likely where the server functions as a print server controlled by a check writing service.

As noted above, other system arrangements are possible for implementation of the invention. For instance, the system can be arranged as one or more of the example systems identified in U.S. patent application Ser. No. 09/999,450, filed on Nov. 15, 2001, entitled "System and Method for Charging for Printing Services Rendered," by Shell Simpson, Ward Foster, and Kris Livingston and bearing Attorney Docket No. 10008256-1, the disclosure of which is hereby incorporated by reference into the present disclosure. In such a case, the data to be printed (i.e., imaging data) can be accessed by imaging destinations (e.g., printing services) in an, at least partially, automated manner.

Figure 3:
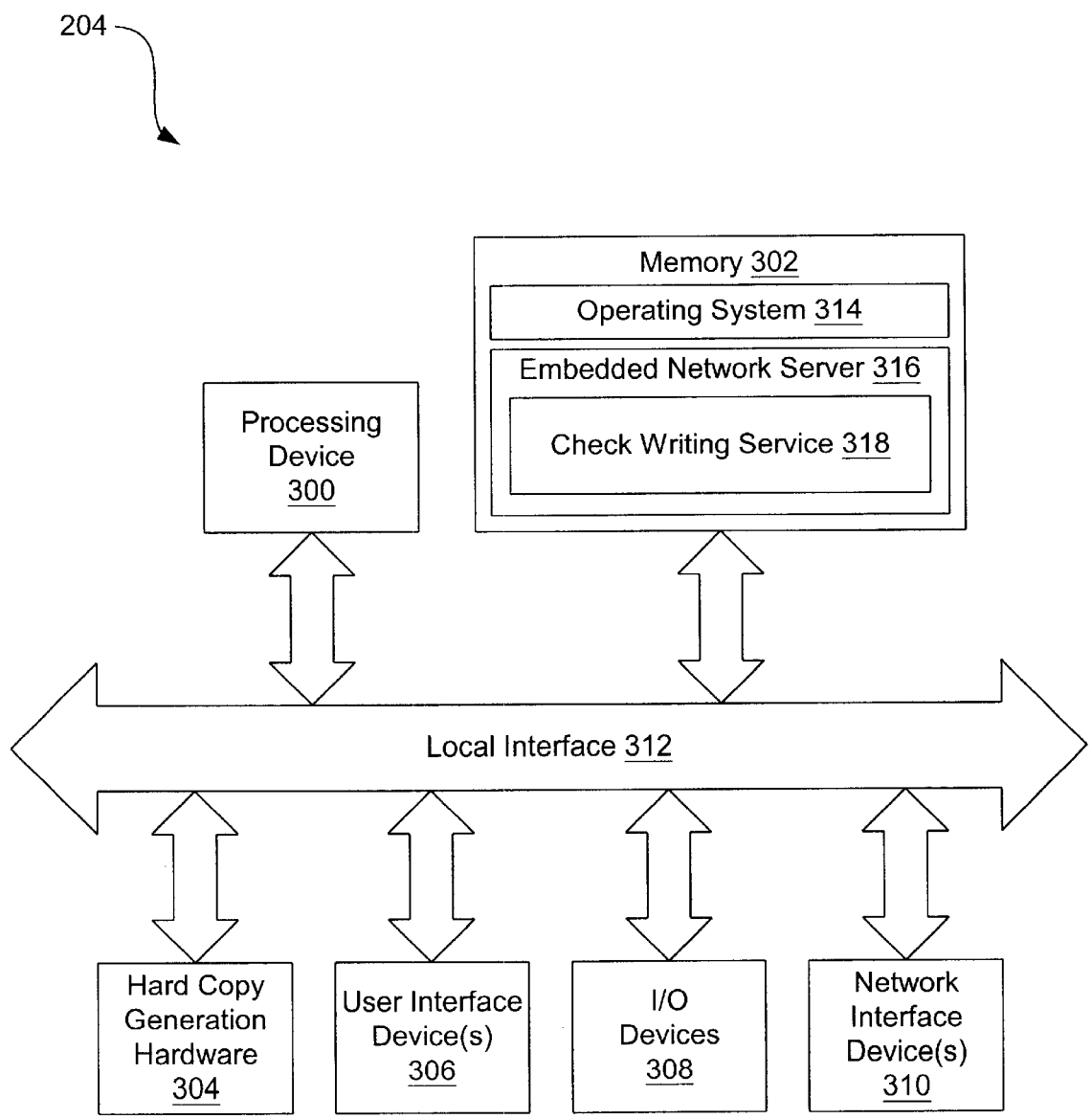
FIG. 3 is a schematic view of a printing device shown in FIG. 2.

FIG. 3 is a schematic view illustrating an example architecture for the printing device 204 identified in FIG. 2. As indicated in FIG. 3, the printing device 204 can generally comprise a processing device 300, memory 302, hard copy generation hardware 304, one or more user interface devices 306, one or more input/output (I/O) devices 308, and one or more network interface devices 310, each of which is connected to a local interface 312 that normally comprises one or more internal and/or external buses.

The processing device 300 is adapted to execute commands stored in memory 302 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the printing device 204. The memory 204 can include any one of a combination of volatile memory elements (e.g., random access memory (RAM, such as DRAM, SRAM, etc.)) and nonvolatile memory elements (e.g., ROM, hard drive, tape, CDROM, etc.).

The hard copy generation hardware 304 comprises the components with which the printing device 204 can generate hard copy documents and, more particularly, with which the device can generate checks. For example, the hard copy generation hardware 304 can comprise a print engine that is possible of many different configurations. The one or more user interface devices 306, where provided, comprise those components with which the user can interact with the printing device 204. By way of example, the user interface devices 306 comprise one or more function keys and/or buttons with which the operation of the device 204 can be controlled, and a display, such as a liquid crystal display (LCD), with which information can be visually communicated to the user and, where the display comprises a touch-sensitive screen, commands can be entered.

With further reference to FIG. 3, the one or more I/O devices 308 are adapted to facilitate communications of the printing device 204 with another device and may therefore include one or more serial, parallel, small computer system interface (SCSI), universal serial bus (USB), IEEE 1394 (e.g., Firewire™), and/or personal area network (PAN) components. The network interface devices 310 comprise the various components used to transmit and/or receive data over a network 208. By way of example, the network interface devices 310 include a device that can communicate both inputs and outputs, for instance, a modulator/demodulator (e.g., modem), wireless (e.g., radio frequency (RF)) transceiver, a telephonic interface, a bridge, a router, network card, etc.

The memory 302 typically comprises an operating system 314. In addition, where the printing device 204 is adapted to support a service that facilitates check writing, the memory 204 typically includes an embedded network server 316. The operating system 314 controls the execution of other software and/or firmware and provides scheduling, input-output control, file and data management, memory management, and communication control and related services. The embedded network server 316 comprises software and/or firmware that is used to serve information to the network 208. Where the network comprises the Internet (public or private), the embedded network server 316 may function as an embedded web server. As indicated in FIG. 3, the embedded network server 316, where provided, comprises a check writing service 318 that, as is discussed in greater detail below, can be used to facilitate the check writing process. The operation of the network server 316 and the check writing service 318 when acting in this capacity is described below with reference to FIGS. 4–5B. Although the check writing service 318 has been identified as being supported by the printing device 204, persons having ordinary skill in the art will appreciate that this service could, alternatively, be provided by another device, for instance one or more of the network servers 206. As will be apparent from the discussions that follow, however, the location of the check writing service 318 is not critical to the operation of the inventive system and method.

Various software and/or firmware has been described herein. It is to be understood that this software and/or firmware can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium"

can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system having been described above, operation of the system will now be discussed. In the discussions that follow, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 4:
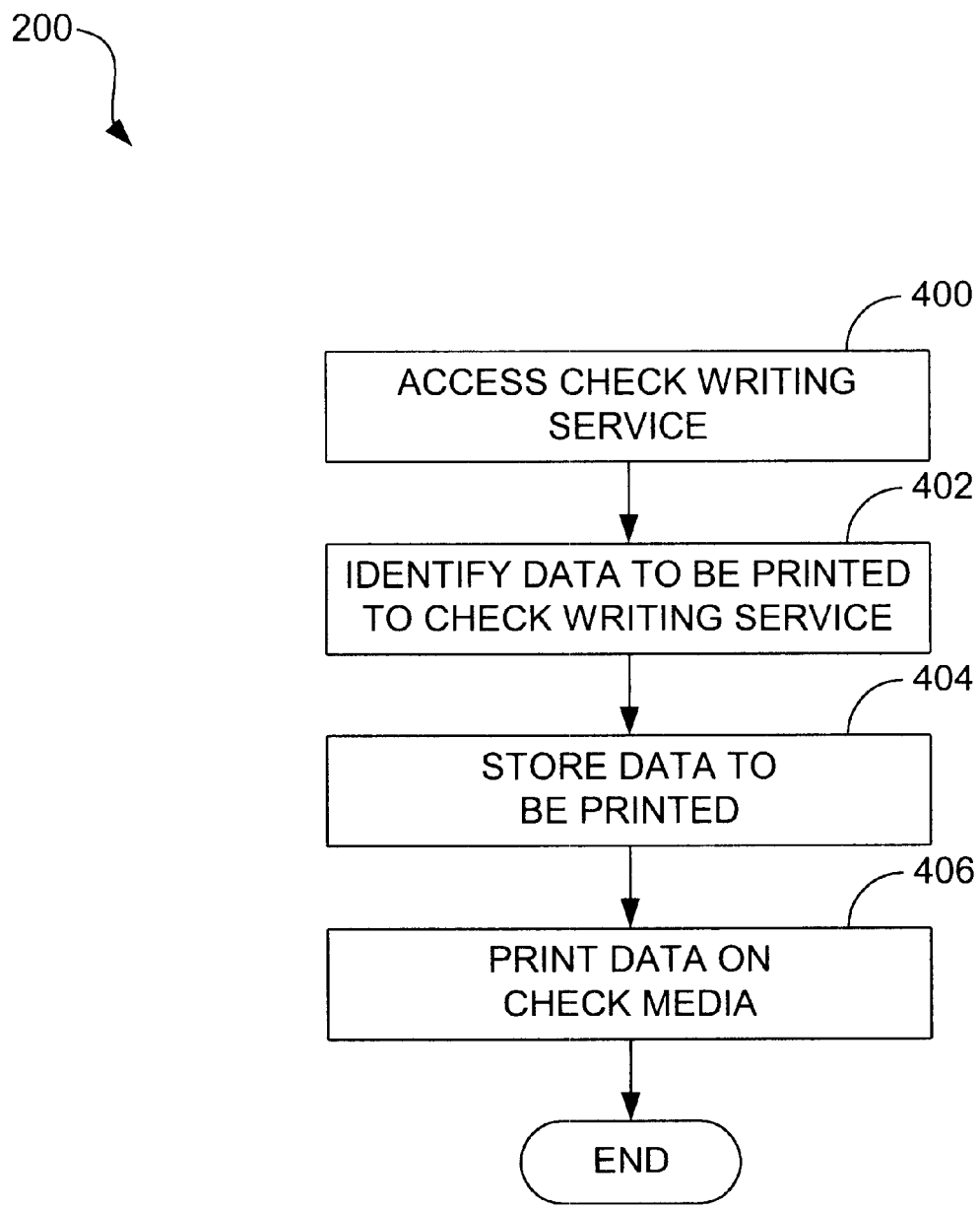
FIG. 4 is a flow diagram that provides an overview of the manner in which the system shown in FIG. 2 can be used to facilitate check writing.

FIG. 4 provides a general overview of the manner in which a user can use the example system 200, or another appropriate system, to facilitate check writing. Beginning with block 400, the check writing service 318 is accessed. Typically, this access is gained via the network 208. For instance, where the check writing service 318 executes on the printing device 204, the user can access the service by directing an appropriate browser to the address (e.g., uniform resource locator (URL)) of the service. After the check writing service 318 has been accessed, the user can identify the data that are to be printed on the check that will be generated, as indicated in block 402. This information typically includes at least a payee name and a payment amount.

Once the data has been entered by the user, the check writing service 318 can store the data, as indicated in block 404. At this point, the user can print the data, as indicated in block 406, by issuing a print command to the check writing service 318. As noted above, the data are typically printed on preprinted check media that are contained within the printing device 204.

Figure 5A:
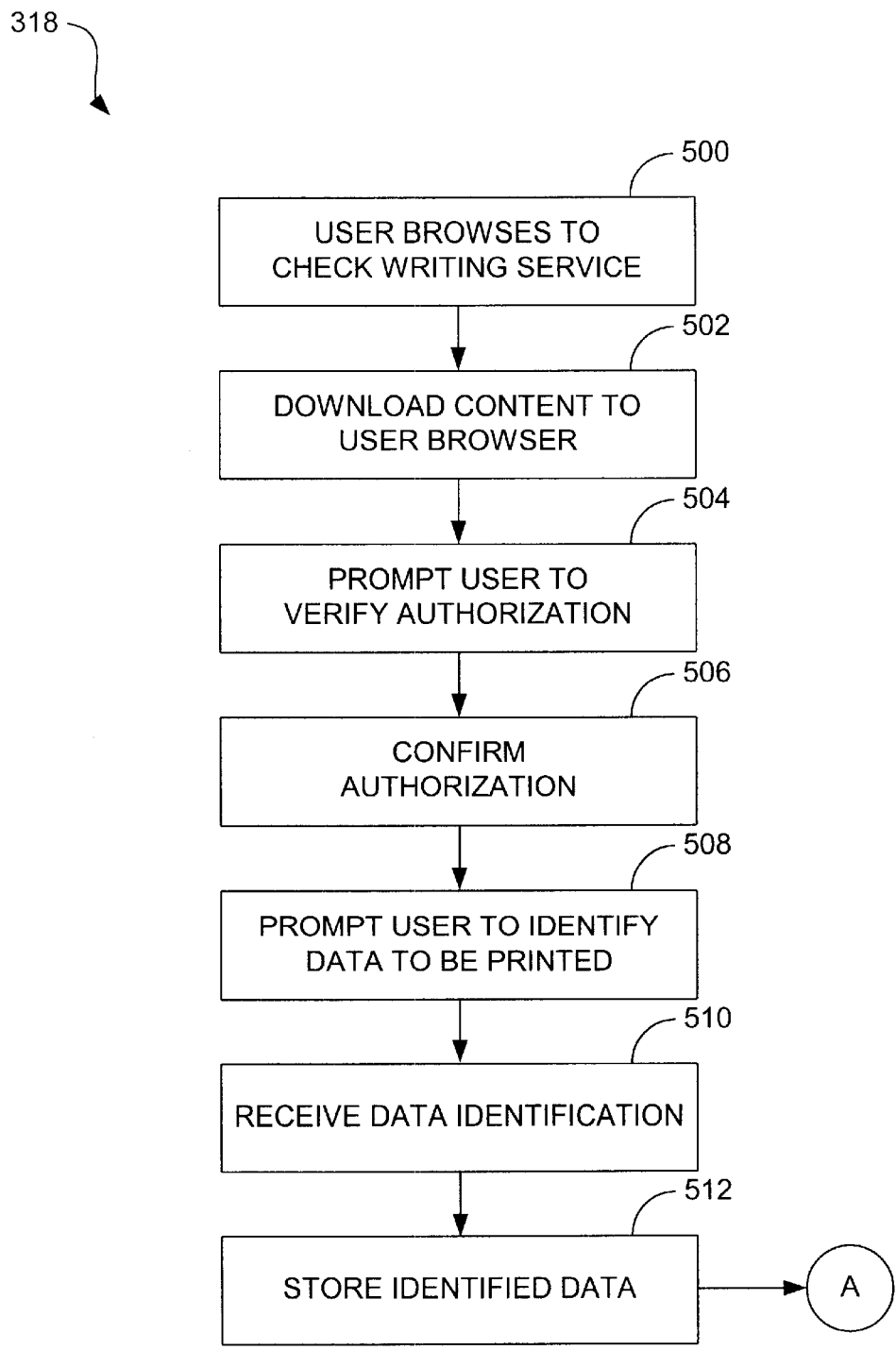
FIGS. 5A and 5B provide a flow diagram of operation of a check writing service of the printing device shown in FIG. 3 in facilitating check generation.
Figure 5B:
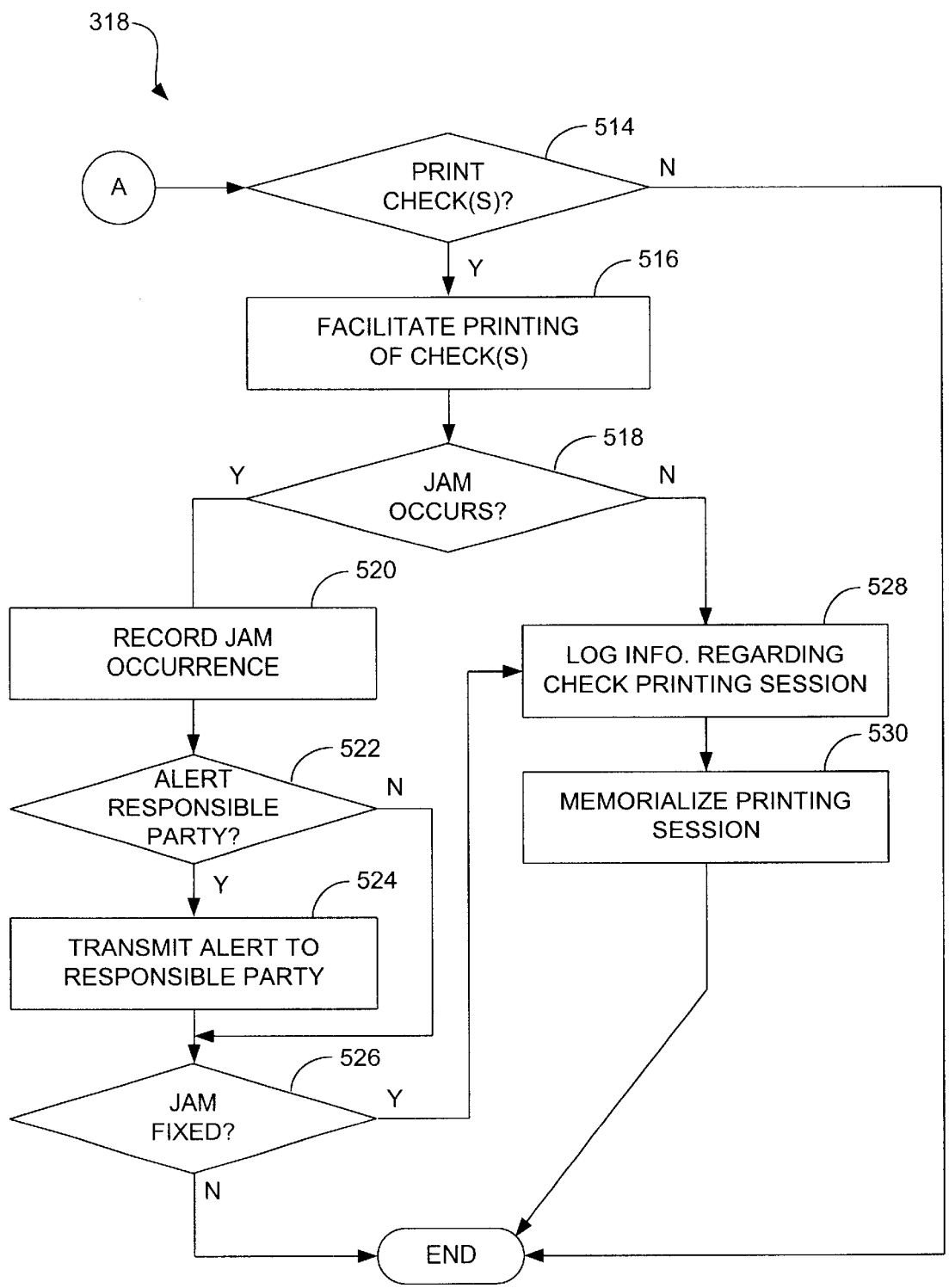

Referring now to FIGS. 5A–5B, a more detailed example of the operation of the system 200 will be provided. More particularly, an example of operation of the check writing service 318 is provided. Beginning with block 500 of FIG. 5A, the user browses to the check writing service 318 using an appropriate network browser (e.g., web browser) that executes on the user computing device 202. Typically, this service 318 comprises a web site that is accessed via the Internet (and/or Intranet). To provide for security, this communication, and those that follow, can be accessed through a secure sockets layer (SSL) or through use of another security scheme. As noted above, the check writing service 318 can, for example, be executed upon the printing device 204. Once the check writing service 318 is accessed, the service downloads content to the user browser, as indicated in block 502. This content normally includes various text and/or graphics that are displayed to the user to facilitate interfacing between the user and the service 318. This content can, optionally, include one or more applications (e.g., applets) that perform certain functions to aid the check writing service 318 and, thereby, facilitate check generation.

After the check writing service 318 has been accessed, the user can be prompted to verify his or her authorization to use the check writing service, as indicated in block 504. By way of example, the user can be prompted to enter a user name and password. Notably, if the user already logged on to the computing device 202 that is being used to access the check writing service 318, the above-noted verification procedure may be unnecessary. Assuming the user to be authorized and therefore capable of establishing his or her authorization, the check writing service 318 can confirm the user authorization, as indicated in block 506.

At this point, the check writing service 318 can prompt the user to identify the data to be printed, as indicated in block 508. Typically, this prompting is effected with an interface (e.g., graphical user interface (GUI)) in the form of one or more web pages that are presented to the user with the user browser. For example, the check writing service 318 can prompt the user to manually enter the data or identify the location of the data. The latter option may be particularly attractive where the user wishes to print several different checks using data from one or more databases. For instance, where the data for several different insurance claimants resides in one or more such databases, the user can identify the location(s) of the database(s) such that the data can be uploaded to the check writing service 318. These databases can, for instance, reside on the user computing device 202 (e.g., on a hard disk) and may comprise one or more files associated with a given user application (e.g., Peachtree™ Quicken™, etc.). If this option is selected, one or more applications (e.g., applets or possibly signed applets which are allowed extensive access to the capabilities of the client system) that were downloaded to the user browser as content can form part of an upload mechanism that is used to perform the upload operation. For instance, the applications can generate a pop-up dialogue box or further web page with which the user can provide one or more file names from which the data is to be retrieved. Where the user does not know of the correct filename(s), the applications can, for instance, be used to scan the user's computing device hard disk so that the user may browse through the contents of the hard disk to locate the appropriate file(s).

Where the databases comprise remote databases, the user can provide an address (e.g., URL) of the databases to be accessed so that the check writing service 318 can retrieve the data. Again, this information can be provided with a dialogue box or further web page that is presented to the user. By way of example, the database(s) can include one or more Internet-accessible database management systems (e.g., Oracle, Sybase, etc.) that the user may presently use to store the data to be printed. In such a circumstance, the user may further be prompted to provide additional information that identifies the print data. For example, the user may be prompted to provide a structured query language (SQL) query to identify which data (e.g., records) are to be accessed by the check writing service 318, and any other details that may be pertinent to identifying and accessing the data (e.g., the credentials needed to access the database, the network address of the database, the name of the database, etc.).

Irrespective of the manner in which the data to be printed is identified, the data identification can be received by the check writing service 318, as indicated in block 510. At this point, the various data to be printed can be stored by the service 318, as indicated in block 512. Where the service 318 is supported by the printing device 204, (i.e., embedded within the device), the data can be stored within memory 302 (e.g., an internal hard disk) of the device. Where the service 318 is not supported by the printing device 204, or where the device lacks the storage resources to store the data in memory 302, the data can be stored in another appropriate storage location that is accessible by the service.

With reference to FIG. 5B and decision element 514, it can then be determined whether checks are to be printed. If the checks are not to be printed, flow for the session is terminated and the user may return to the service 318 at a later time to print the checks, if desired. If, however, the user does wish for checks to be printed, the check writing service 318 facilitates this printing, as indicated in block 516, by, for example, sending a print job comprising the data and its arrangement to the hard copy generation hardware 304.

As noted above, there is nearly always potential for fraud when printing checks. To cite one example way in which fraud can be perpetrated, an unscrupulous user can simulate a jam of the printing device 204 in an attempt to access the preprinted blank checks that the device contains. To prevent such activity or, to at least more quickly identify the perpetrator, the check writing service 318 can be configured to detect when a jam condition is registered. This detection is possible in that the check writing service 318 is closely linked with the printing device 204 (e.g., stored in the printing device).

Assuming the service 318 to be configured to provide such functionality, flow continues to decision element 518 at which it is determined whether a jam occurs. This determination can be made affirmatively by the check writing service 318 through various detection means, or can be made with reference to a notification that is delivered to the service from another device component. Regardless, if no jam occurs during the printing of the check(s), flow continues to block 528 described below. If, on the other hand, a jam does occur, flow continues to block 520 at which the jam occurrence is recorded along with information about who sent the print job, when the jam occurred, etc. This information can be recorded within the printing device 204 (e.g., within an internal hard disk) or in another location accessible via the network 208. In addition, it can be determined, at decision element 522, whether to alert a responsible party as to the jam condition. In that checks are being printed, such a jam condition is an inherently suspect condition. For this reason, it may be desirable to provide an immediate notification to the responsible party who may, for instance, hold a managerial position.

If no alert is to be transmitted, flow continues to decision element 526 described below. If the alert is to be transmitted, however, it is transmitted to the responsible party, as indicated in block 524. This alert can comprise, for instance, an email message, a text message that is sent to a portable device (e.g., PDA, mobile telephone) of the responsible party, a page that is sent to a pager of the responsible party, combinations thereof, etc. Accordingly, the responsible party can immediately be made aware of the situation and, if on the premises, immediately investigate the situation personally.

With reference to decision element 526, if the jam is not fixed, flow for the printing session is terminated until such time when the device 204 is again operational. Once the jam is fixed, however, the check writing service 318 logs information about the completed check printing session, as indicated in block 528, such as when the print job was initiated, who initiated the print job, who the listed payee(s) is/are, the amount of the check(s), etc. By way of example, this information can be stored within memory (e.g., internal hard disk) of the printing device 204 or another designated location that is accessible via the network 208. At this point, the printing session can be memorialized as indicated in block 530. This memorialization can take many different forms. By way of example, the check writing service 318 can generate a receipt that can, for instance, be printed along with the printed check so that the user (i.e., sender) can obtain a record of the printing of the check. This record can include some or all of the information that was logged by the check writing service 318 as noted above with reference to block 528. This printed receipt can then be provided to the payee of the check (e.g., insurance claimant). Alternatively, an electronic receipt can be generated for the user and stored in a designated location that is accessible over the network 208 for later retrieval and/or inspection. For instance, the electronic receipt can be stored in a personal imaging repository of the user in the manner described in U.S. patent application Ser. No. 09/999,450, filed on Nov. 15, 2001, identified above (Attorney Docket No. 10008256-1).

Operating in the manner described above, the system and method can be used to simplify check writing in that the check writing service can be managed from a single control point as opposed to being distributed over several different computing devices. Moreover, as noted above, fraud can be prevented and/or quickly discovered with greater ease.

Although the jam scenario has been discussed in detail, it is to be understood that the same antifraud measures described above can be used for any other type of occurrence that may be deemed suspicious (i.e., susceptible to fraudulent activity) that may arise.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for writing a check, comprising the steps of:
   verifying the authorization of a user to print checks;
   receiving from the user data to be included in a check to be printed via a network;
   configuring the received data for printing on a check;
   facilitating printing of the check;
   detecting a printing device jam that occurs during printing of the check; and
   recording information regarding the jam occurrence including: (i) that a jam occurred during printing of a check, (ii) when the jam occurred, and (iii) who sent the data to be included in the check.

2. The method of claim 1, wherein the step of receiving data comprises receiving data with a web-based check writing service.

3. The method of claim 2, wherein the check writing service is hosted by a printing device.

4. The method of claim 1, further comprising the step of immediately alerting a responsible party if a jam occurs.

5. The method of claim 4, wherein the step of immediately alerting a responsible party comprises at least one of transmitting an email message to the responsible party, transmitting a text message to a mobile telephone of the responsible party, and sending a page to a pager of the responsible party.

6. The method of claim 1, further comprising the step of logging information regarding the check writing session.

7. The method of claim 1, further comprising generating a receipt pertinent to the check writing session.

8. The method of claim 7, wherein the receipt is an electronic receipt stored in a personal imaging repository of a user that initiated the check writing session.

9. A system for writing a check, comprising:
    means for identifying users that wish to print checks;
    means for receiving from the users data to be included in checks to be printed via a network;
    means for configuring the received data for printing on checks;
    means for facilitating printing of checks;
    means for detecting printing device jams that occur during printing of checks; and
    means for recording information regarding jam occurrences including: (i) that a jam occurred during printing of a check, (ii) when the jam occurred, and (iii) who sent the data to be included in the check.

10. The system of claim 9, wherein the means for receiving data comprises a web-based check writing service hosted by a printing device.

11. The system of claim 9, further comprising means for immediately alerting a responsible party if a jam occurs.

12. The system of claim 9, further comprising means for generating a receipt pertinent to the check writing session.

13. The system of claim 12, wherein the means for generating a receipt are configured to store the electronic receipt in a personal imaging repository of a user that initiated the check writing session.

14. A printing device, comprising:
    hard copy generation hardware;
    a processing device; and
    memory including an embedded network server, the server hosting a check writing service with which checks can be created and printed, the check writing service including logic configured to determine if a printing device jam occurs during printing of a check and logic configured to, when such a jam occurs, record the identity of a user who requested printing of the check.

15. The printing device of claim 14, wherein the check writing service includes logic configured to present a check writing web site to a user.

16. The printing device of claim 14, wherein the check writing service further includes logic configured to immediately alert a responsible party if a jam occurs.

17. The printing device of claim 14, wherein the check writing service further includes logic configured to record when the jam occurred.

18. The printing device of claim 14, wherein the check writing service further includes logic configured to verify the authorization of a user to print checks before printing a check.

19. A method for writing a check, comprising:
    verifying the authorization of a user to print checks using a check writing service hosted on a printing device;
    receiving from the user with the check writing service data to be included in a check to be printed by the printing device;
    configuring the received data for printing on a check;
    facilitating printing of the check;
    detecting a printing device jam that occurs during printing of the check;
    recording information using the check writing service, the information including: (i) that a jam occurred during printing of a check, (ii) when the jam occurred, and (iii) who sent the data to be included in the check; and
    sending an alert to a responsible party with the check writing service, the alert notifying the responsible party that the jam occurred.

20. A check writing service stored on a computer-readable medium, the service comprising:
    logic configured to identify a user who wishes to print a check;
    logic configured to configure data received from the user to facilitate printing of a check;
    logic configured to detect a printing device jam that occurs during printing of the check; and
    logic configured to record information regarding the jam occurrence including when the jam occurred and the identity of the user.

21. A printing device, comprising:
    hard copy generation hardware;
    a processing device; and
    memory including a check writing service, the check writing service being configured to identify a user who wishes to print a check, configure data received from the user to facilitate printing of a check, detect a printing device jam that occurs during printing of the check, and record information regarding the jam occurrence including when the jam occurred and the identity of the user.

* * * * *